July 17, 1956

C. P. BERGSTROM 2,754,853

MULTICOLOR WEFT REPLENISHING LOOM WITH ROTARY MAGAZINE

Filed Oct. 5, 1953

INVENTOR
CARL P. BERGSTROM
Chas. T. Hawley
ATTORNEY

July 17, 1956 C. P. BERGSTROM 2,754,853
MULTICOLOR WEFT REPLENISHING LOOM WITH ROTARY MAGAZINE
Filed Oct. 5, 1953 6 Sheets-Sheet 2

INVENTOR
CARL P. BERGSTROM
Chas. T. Hawley
ATTORNEY

July 17, 1956  C. P. BERGSTROM  2,754,853
MULTICOLOR WEFT REPLENISHING LOOM WITH ROTARY MAGAZINE
Filed Oct. 5, 1953  6 Sheets-Sheet 4

INVENTOR
CARL P. BERGSTROM
Chas. F. Hawley
ATTORNEY

July 17, 1956

C. P. BERGSTROM 2,754,853

MULTICOLOR WEFT REPLENISHING LOOM WITH ROTARY MAGAZINE

Filed Oct. 5, 1953

INVENTOR
CARL P. BERGSTROM
Chas. T. Hawley
ATTORNEY

July 17, 1956  C. P. BERGSTROM  2,754,853
MULTICOLOR WEFT REPLENISHING LOOM WITH ROTARY MAGAZINE
Filed Oct. 5, 1953  6 Sheets-Sheet 6

INVENTOR
CARL P. BERGSTROM
Chas. T. Hawley
ATTORNEY

United States Patent Office 2,754,853
Patented July 17, 1956

2,754,853

MULTICOLOR WEFT REPLENISHING LOOM WITH ROTARY MAGAZINE

Carl Philip Bergstrom, Millbury, Mass., assignor to Crompton & Knowles Loom Works, Worcester, Mass., a corporation of Massachusetts Application October 5, 1953, Serial No. 384,037

36 Claims. (Cl. 139—232)

This invention relates to improvements in multicolor weft replenishing looms more particularly of the type employing rotary reserve bobbin magazines.

When the principle of multicolor weft replenishment has been applied to rotary reserve bobbin magazines in the past it has been customary to arrange the bobbins in groups, each bobbin of a group being distinct from the other bobbins of the group, and control the magazines so that when a transfer occurs with respect to any bobbin in a group the magazine is rocked so that the next group comes into action. This procedure greatly reduces the usable bobbins in the magazine since there will always remain in the group all of its bobbins except the one transferred and these remaining bobbins move out of action and become unavailable for replenishing operations as the next group comes into action.

It is the general purpose of the present invention to provide a rotary reserve bobbin magazine so controlled and operated that it is possible to use all of the bobbins of a group before bringing the next group into action provided the bobbins are transferred in the order in which they would be moved to transfer position by rotation of the magazine. Thus, in a four-color loom operating with bobbin groups having bobbins R, W, B and G arranged in that order from transfer position it will be possible to transfer the bobbins in that order from the first group provided the shuttles corresponding to them become depleted in the same order. If the first bobbin of the group is transferred and bobbin B is the next to be transferred then it will be possible at a later time to transfer bobbin G, but it will not be possible to go back and transfer bobbin W which was skipped when bobbin B was moved to transfer position. This is due to the fact that the magazine normally turns in only one direction. It will thus be seen that a loom constructed in this manner can theoretically use all of the bobbins in the magazine if the shuttles become depleted in such order as to permit this operation, but if this order of depletion of shuttles does not occur it is still possible to use more of the bobbins in the magazine than is possible under prior practice.

It is a further object of the invention to provide a construction which will enable the magazine to remain in the position it occupies at the time a bobbin is transferred so that any bobbin behind the latter in the order of presentation to transfer position will be available for a replenishing operation.

It is a further object of the invention to provide a loom of the type described which can operate with either four, three or two shuttles, this result being accomplished by changing the relation of ratchets which move with the magazine. If there are four shuttles there will then be four ratchets, one for each shuttle, and the actuating pawl for the ratchets will move into register with the ratchet corresponding to the active shuttle and when the latter moves out of action the pawl will then move into register with the ratchet corresponding to the next shuttle in active position. The teeth of the different ratchets are staggered angularly around the axis of the ratchets in equal angular steps for any given number of shuttles being used in the loom. The stepping off of the teeth of the different ratchets will be progressive from one end of the series of ratchets to the other end thereof so that if in a four-color operation the tooth of an end ratchet is at the beginning of the working stroke of the pawl then the teeth of the other ratchets will be progressively farther from the beginning of the stroke.

It is the further object of the invention to provide an improved lock means to prevent overrun and rebound of the magazine. The lock mechanism includes a lost motion device which delays action of the lock until near the end of the angular motion of the magazine.

It is a further object of the invention to provide an improved pattern chain control to effect registry of the pawl with the several ratchets one at a time, this control cooperating with rolls of different sizes on the chain and having curved areas of different radii so that after the indicating lever has been lifted to any given position, determined by the size of the roll engaging it, the curve engaging the roll will be able to maintain the lever in fixed position and thus prevent vibration of the pawl.

The pawl for operating the ratchets moves with each shift of the shuttle box and in order to prevent it from engaging the several ratchets it is a further object of the invention to provide means for holding the pawl clear of the ratchets during its normal shifting but acting to permit the pawl to fall into working position whenever it is called upon to operate.

In order that the invention may be clearly understood reference is made to the accompanying drawings which illustrate by way of example four embodiments of the invention and in which:

Fig. 8, Figs. 10, 11 and 12 are vertical sections on lines 10—10, 11—11 and 12—12, respectively, Fig. 8, Fig. 18 is an end elevation of the left hand end of the loom, Fig. 19, Figs. 21 and 22 are detail vertical sections on lines 21—21 and 22—22, Fig. 20.

Figures 1, 7:
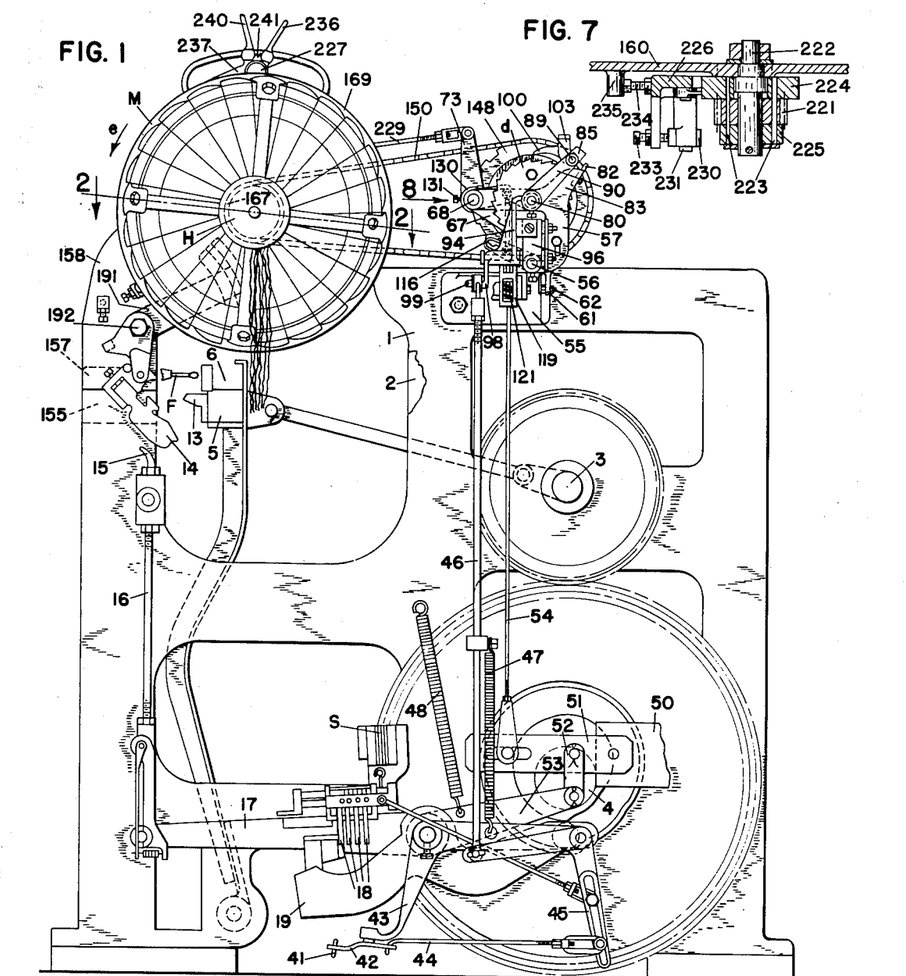
Fig. 1 is an end elevation of the right hand end of a loom showing the preferred form of the invention applied thereto.
Fig. 7 is a detail horizontal section on line 7—7, Fig. 3.
Figures 18, 21, 22:
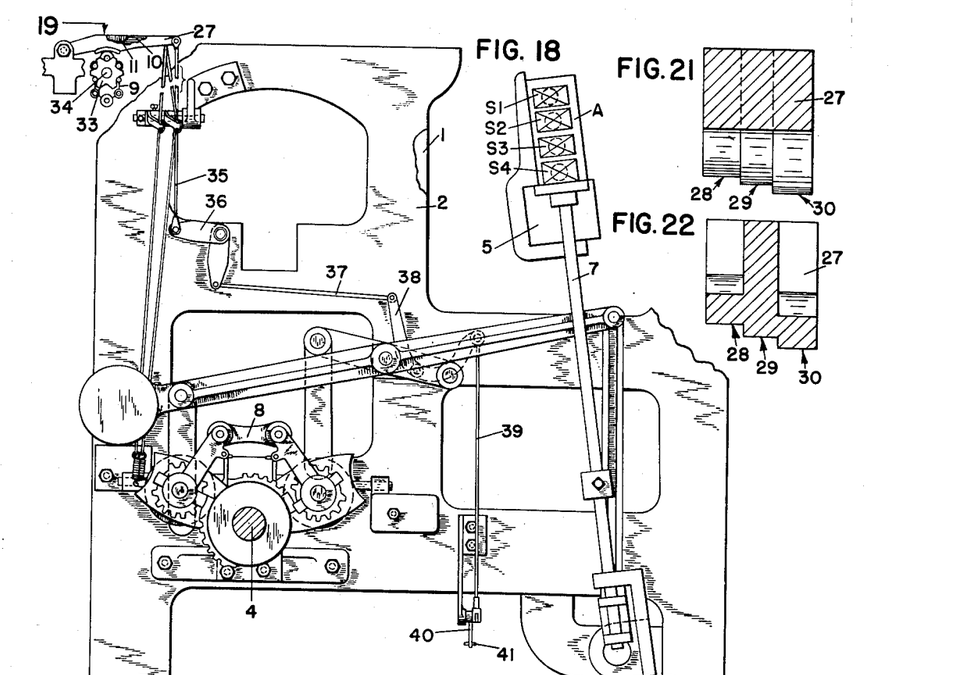

Referring to Figs. 1 and 18, the frame of the loom includes right and left loomsides 1 and 2, respectively, which support top and bottom shafts 3 and 4, respectively, shaft 3 turning twice for one turn of shaft 4. A lay 5 is oscillated backwardly (to the right, Fig. 1) and forwardly by the top shaft in usual manner and has a shuttle box 6 on its right hand end and a gang A of shuttle boxes to accommodate four shuttles S1, S2, S3 and S4 provided with distinctive weft. Gang A is supported on a box lifter rod 7 movable vertically to move any selected shuttle into active position. A known form of box shifting mechanism 8 is operatively connected to rod 7 and is controlled by a pattern chain 9 by means of two indicator levers 10 and 11. Further reference will be made to chain 9 hereinafter.

The right hand end of the lay 5 has a bunter 13 to operate a transferrer latch 14. The latter, normally below the path of the bunter, is raised into the path by a lifter 15 through action of rod 16 connected at its lower end to a normally stationary lever 17 having thereon indicators 18, one for each shuttle box.

A weft detector or feeler F, when indicating exhaustion of weft in a shuttle in box 6 energizes a solenoid S which moves the indicator 18 corresponding to the shuttle to indicated position to cause regularly rocking lever 19 to raise the left hand end of lever 17 to raise rod 16 and place latch 14 into the path of bunter 13 on a later pick of the loom when the exhausted shuttle is again active to enter box 6 from the opposite side. The forward beat of the lay occurring when the exhausted shuttle has returned to box 6 causes bunter 13 to move the latch forwardly to effect a bobbin transfer. This mechanism is similar to that shown in Patents Nos. 2,128,060 and 2,222,994 except that the indicators shown in the former patent, instead of controlling the lifting of shuttle boxes in a shuttle changing loom will, in the present instance, control lifting of a rod in Patent No. 2,222,994 corresponding to rod 16 herein.

Figures 19, 20, 23:
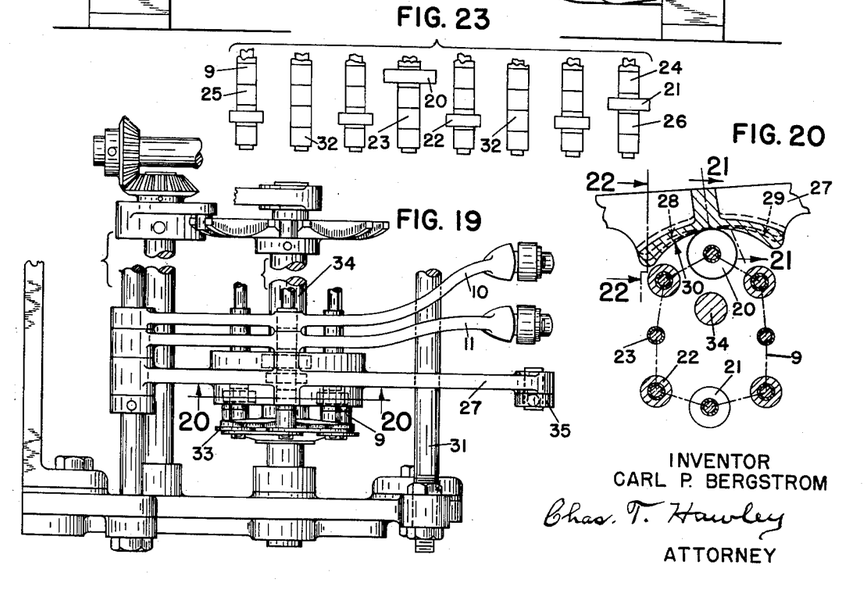
Fig. 19 is an enlarged plan view in the direction of arrow 19, Fig. 18.
Fig. 20 is a vertical section on line 20—20.
Fig. 23 is a diagram showing a draft of that part of the pattern chain which determines the position of the feed pawl.

The feed pawl for the ratchets to be described hereinafter must be kept in register with the ratchet it is engaging. To accomplish this result the pattern chain has additional rolls beyond those which call the box motion 8. As shown in Fig. 23 the chain has four sizes of rolls, the large size 20, the next size 21, a third size 22 smaller than rolls 21, and the smallest size 23. The large rolls 20 are aligned in row 24, rolls 21 are aligned on row 25, and rolls 22 and 23 are aligned in row 26.

A feed pawl indicating or control lever 27 extends over the part of the chain 9 shown in Fig. 20 and has on the underside thereof three roll engaging surfaces 28, 29 and 30 corresponding respectively to and positioned for engagement with rolls 20, 21 and 22. A stationary stop 31 supports lever 27 when the smallest size roll 23 is under surface 30. Lever 27 will be in its lowest position on stop 31 temporarily out of engagement with the pattern chain when all of the rolls on a bar of the chain under it are of the smallest size, as bar 32, Fig. 23.

Chain 9 is on a cylinder 33 on shaft 34 which is turned in known manner at two pick intervals. The outer edges of the variously sized rolls are at different distances from the axis of shaft 34 so that if lever 27 had only a single curved surface which was concentric with shaft 34 when engaging one or another of the rolls 20, 21 or 22 lever 27 would remain stationary when that roll passed under it, but would vibrate vertically when engaging either of the other two rolls. The curved surfaces on lever 27 are of such shape, however, that each of them, when engaging its particular size of roll, will enable the lever 27 to remain stationary at the level to which it has been raised by the roll and not vibrate vertically. The lever 27 can therefore assume four positions and be held against vibration when in any position as the chain roll engaging it passes under it.

The free end of lever 27 is connected to a depending rod 35 operatively connected by lever 36 to another rod 37 connected by lever 38, rod 39 and lever 40 to a rod 41 extending across the loom and connected to lever 42 pivoted on stationary support 43, see Fig. 1. A rod 44 connects lever 42 to another lever 45 pivoted on support 43 and connected to an upwardly extending rod 46. A spring 47 operatively connected to support 43 and rod 46 tends to pull the latter down but yields to permit it to be raised by lever 27.

Referring to Fig. 1, a stationary stand 50 has pivoted thereon a lever 51 connected by link 52 to a rearwardly extending arm 53 on lever 17. Extending upwardly from lever 51 is a rod 54 which is pulled down by lever 17 whenever latch 14 is raised for a bobbin changing operation, otherwise rod 54 is stationary.

Figure 8:
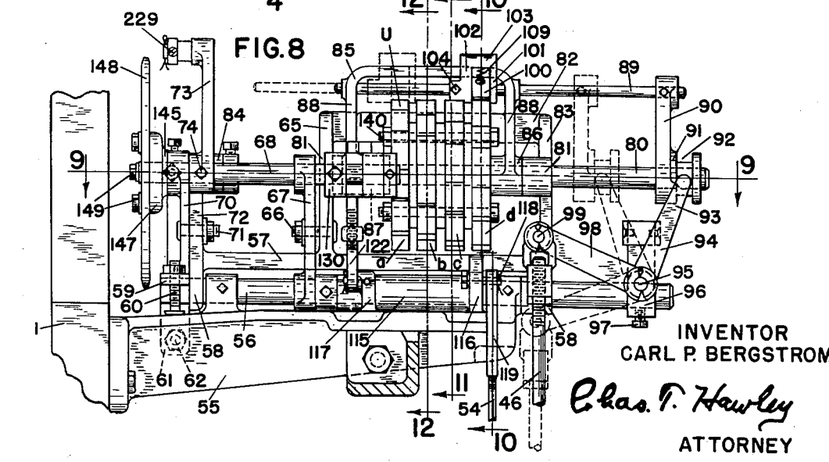
Fig. 8 is an enlarged front elevation looking in the direction of arrow 8, Fig. 1.
Figure 10:
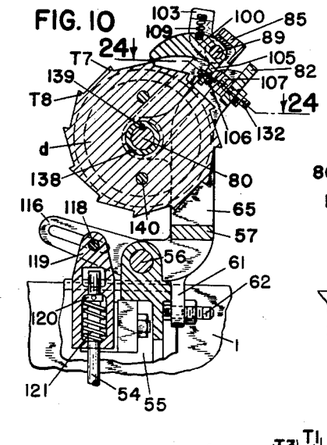
Figure 11:
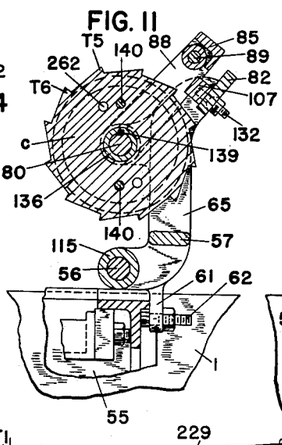
Figure 12:
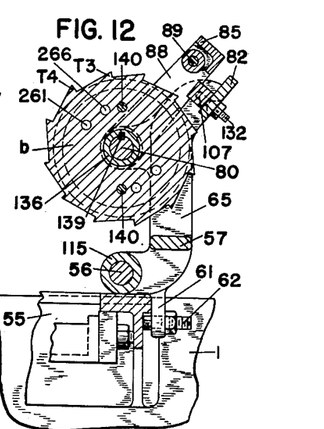

A stand 55, Figs. 8 and 10, is secured to the loom frame 1 and has secured thereto a support rod 56. A frame 57 has hubs 58 on rod 56 and has an arm 59 provided with an adjustable stop screw 60 engaging stand 55 to limit counter-clockwise turning of frame 57 on rod 56, see Fig. 13. A second arm 61 on frame 57 has an adjustable stop screw 62 engaging stand 55 to limit clockwise movement of frame 57 on rod 56, Fig. 10. The frame 57 can thus be adjustable angularly around rod 56 and will be held stationary on stand 55 in adjusted position.

Extending upwardly from frame 57, Fig. 8, is an arm 65 to which is bolted at 66 a spacing support 67 the lower end of which is supported on rod 56 and the upper end of which supports a lock shaft 68. A second spacing support 70 similar to support 67 is bolted at 71 to another upright arm 72 on frame 57 supported at its lower end on rod 56 and its upper end affords a second support for shaft 68, see Figs. 8 and 9. A lock operating arm 73 shown in Fig. 1 is secured at 74, Fig. 9, to shaft 68 for a purpose to be described.

Figure 9:
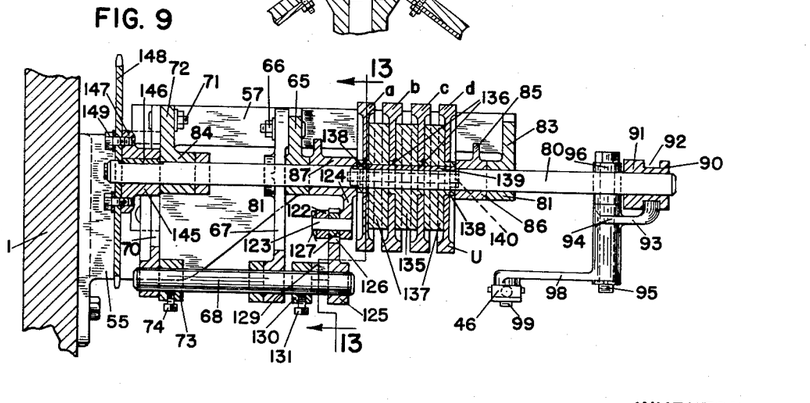
Fig. 9 is a horizontal section on line 9—9.

A magazine control shaft 80, Figs. 8 and 9, is supported for rotation in hubs 81 on frame 57 which has a cross bar 82 extending to the right from arm 65, Fig. 8, to another arm 83 which has the right hand hub 81, Fig. 9, formed therewith. The left hand end of shaft 80 is rotatably supported in a hub 84 on arm 72, Figs. 8 and 9. The shaft 80 is thus mounted for rotation on frame 57.

A rocking carrier 85 has hubs 86 and 87 rockable on shaft 80, see Figs. 8 and 9. Carrier 85 has two spaced arms 88 in which is slidably mounted a pawl rod 89 parallel to shaft 80 and having its right hand end secured to a positioner arm 90 having a hub 91 slidable on shaft 80. A circular groove 92 on hub 91 receives the upper end of arm 93 of a pawl positioning lever 94 pivoted on a stud 95 on a collar 96 secured at 97 to rod 56. The other arm 98 of lever 94 is pivoted at 99 to the upper end of previously described rod 46.

A pawl 100, see Figs. 8 and 10, is pivoted on rod 89 and is held in position along rod 89 between the right and left hand sides 101 and 102, respectively, of a member 103 secured to rod 89 by a set screw 104. A finger 105 has rotatable thereon a roll 106 for engagement with a positioning bar on plate 107 held to cross bar 82 by screws 108, see Fig. 24. A spring 109 between member 103 and pawl 100 tends to turn the latter counterclockwise, Fig. 10, to hold the roll against bar 107 when the rod 89 slides lengthwise.

Figure 13:
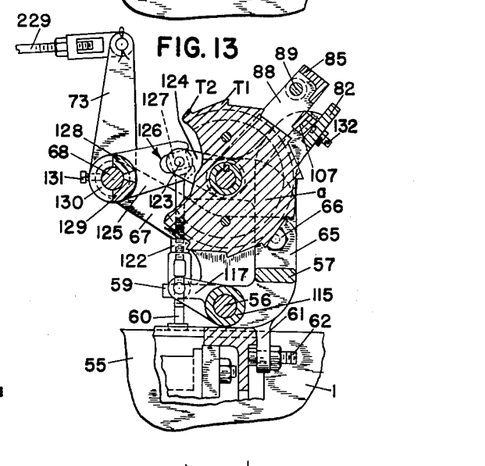
Fig. 13 is a vertical section on line 13—13, Fig. 9, parts being broken away.

The means for rocking the pawl on its working stroke includes a long hubbed lever 115 rockable on rod 56 and having arms 116 and 117, Figs. 8 and 13. A stud 118 adjustable along arm 116 has pivoted thereon a rod head 119 formed as shown in Fig. 10 to receive the upper end of rod 54. Rod 54 has secured thereto a collar 120 and a compression spring 121 between a lower part of the rod head and the collar holds the latter normally up against an upper part of the rod head, see Fig. 10.

Arm 117 of lever 115 is pivoted to an upwardly extending rod 122 the upper end of which is pivoted on a stud 123 fixed to an arm 124 of the carrier 85, see Fig. 9. An arm 125 loose on shaft 68 is slotted at 126 to slidingly receive a block 127 pivoted on stud 123. Arm 125 has a lug 128 normally spaced from another lug 129 aligned with it on a collar 130 secured at 131 to a shaft 68. Arm 125 can partake of a limited angular motion, clockwise Fig. 13, before the lugs engage each other, continued motion of the lug 128 causing turning of shaft 68.

Figure 24:
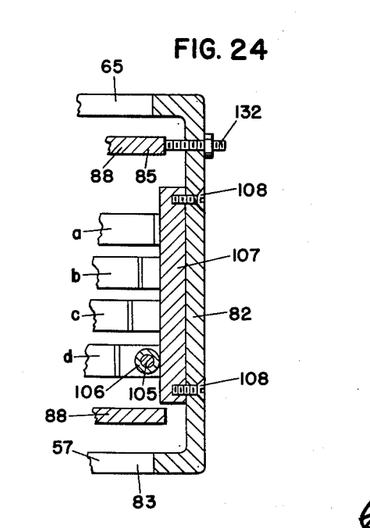
Fig. 24 is a horizontal section on line 24—24, Fig. 10.

The cross bar 82 has an adjustable stop screw 132 to engage one of the arms 88 of carrier 85, Fig. 24, to limit clockwise movement of the latter as viewed in Fig. 10. A spring 48, Fig. 1, normally tends to lift lever arm 53 and rod 54 to hold the pawl carrier 85 in its normal position shown for instance in Fig. 13. When arm 53 moves down incident to lifting of latch 14 a down force is transmitted through spring 121, Fig. 10, to move the pawl carrier 85 on a working stroke to the left from the position shown in Fig. 13, movement of arm 73 to the right, Fig. 1, occurring during the latter part of the working stroke of the carrier and pawl. The pawl always swings through the same arc when having a working stroke.

For controlling the magazine there are secured to shaft 80 as many ratchets as there are colors being woven. All the ratchets have the same number of teeth, twelve as shown herein. In the preferred form using four colors there will be four ratchets designated in Fig. 9 at *a, b, c,* and *d*. A center spacer 135 has hubs 136 on opposite sides thereof, each hub abutting a side spacer 137 of which there are two. The side spacers have hubs 138, one to the right and the other to the left, Fig. 9. The hubs are keyed to shaft 80 at 139, Fig. 10. Bolts 140 passing through the ratchets and spacers clamp these latter parts as a unit U turning with shaft 80.

The ratchets are set at different angular positions on the shaft 80, the angular space between adjacent teeth of any ratchet being 30 degrees in the example of the invention described herein. The ratchets are set, however, so there will be an angular distance of 7½ degrees between the teeth of adjacent ratchets. Thus, in Fig. 14, teeth T1 and T2 of ratchet *a* correspond, respectively, to the beginning and the end of the working stroke of the pawl, the stroke being slightly more than 30 degrees. Teeth T3 and T4 of ratchet *b* are set 7½ degrees ahead of teeth T1 and T2, respectively, and teeth T5 and T6 of ratchet *c* are set ahead another 7½ degrees, or 15 degrees ahead of teeth T1 and T2, respectively. Teeth T7 and T8 of ratchet *d* are set 22½ degrees ahead of teeth T1 and T2, respectively. That is, beginning with ratchet *a*, each succeeding ratchet is set ahead with respect to the beginning of the working stroke of the pawl 7½ degrees from the ratchet behind it.

Figure 14:
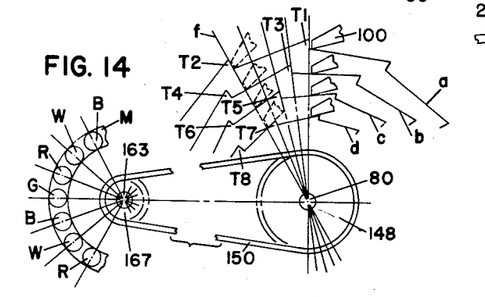
Fig. 14 is a diagrammatic view showing the relation of the four ratchets and the feed pawl for the preferred form in which four colors are used.

A working stroke of the pawl if registered with ratchet *a* will turn shaft 80 30 degrees by engagement with tooth T1. If registered with ratchet *b* the pawl will engage tooth T3 and move ratchet *b* 22½ degrees. If registered with ratchet *c* the pawl will engage tooth T5 and move ratchet *c* 15 degrees. Finally, if the pawl registers with ratchet *d* it will rock the latter 7½ degrees by engagement with tooth T7. Thus, for a full working stroke of the pawl, shaft 80 can be given a full 30 degree movement, or a movement which is ¾, ½ or ¼ of the stroke of the pawl or full movement, depending upon with which ratchet the pawl registers. Any ratchet, however, can be given any one of the four degrees of motion depending upon the location of its teeth T1, T3, T5 or T7 with respect to the beginning of the working stroke of the pawl.

Turning of the shaft 80 is for the purpose of turning a sprocket wheel. Shaft 80 has a wheel carrier hub 145 keyed thereto at 146 and having a flange 147, see Fig. 9. In the preferred form a large sprocket wheel 148 is secured to the flange by screws 149 and meshes with a chain 150.

Figure 2:
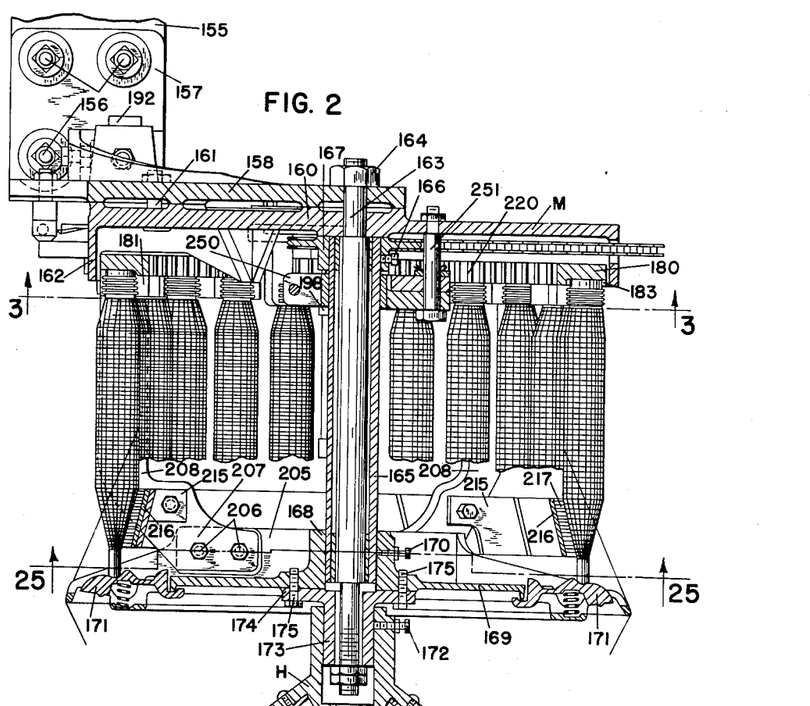
Fig. 2 is an enlarged substantially horizontal section on line 2—2, Fig. 1.
Figures 3, 4:
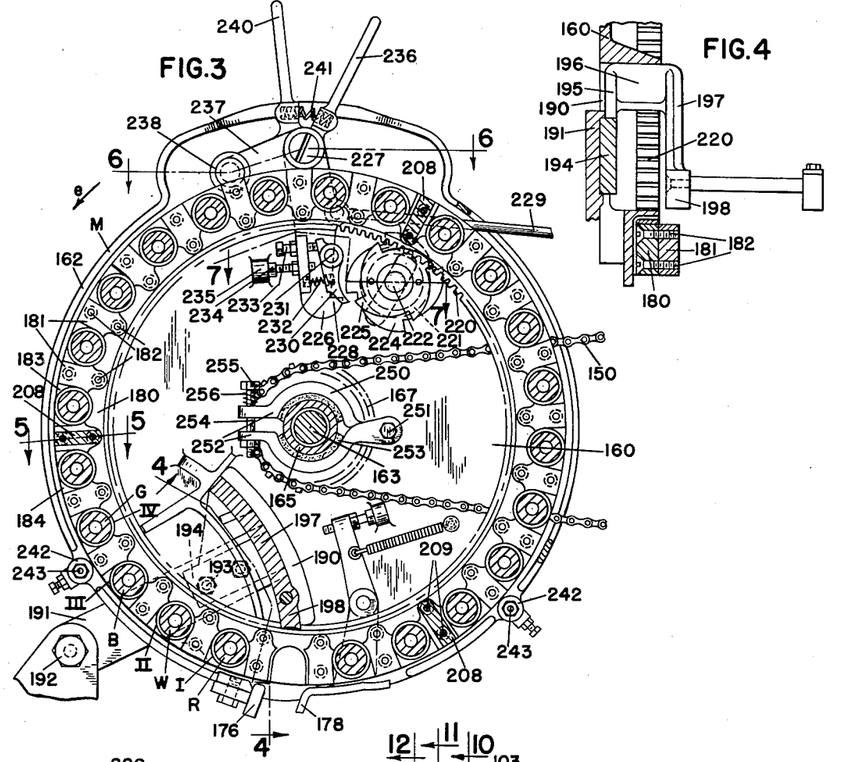
Fig. 3 is a vertical section on line 3—3, Fig. 2.
Fig. 4 is a detail vertical section on line 4—4, Fig. 3.

The reserve bobbin magazine M is of the rotary type and is shown principally in Figs. 1, 2 and 3. The breast beam 155 of the loom has secured thereto at 156 the foot 157 of a support 158. A circular plate 160 is bolted at 161 to support 158 and has a circular flange 162. A large horizontal stud 163 is held rigidly to the support 158 and plate 160 by nut 164. A sleeve 165 around part of the stud has secured thereto at 166 a sprocket wheel 167 of half the size of sprocket 148 meshing with chain 150.

The sleeve extends outwardly from plate 160 and has the hub 168 of a disk 169 secured thereto at 170. The disk has the usual bobbin tip holders 171, twenty-four in the present instance, and a weft end holder H is held at 172 to a fitting 173 the flange 174 of which is held by screws 175 to disk 169. The magazine also has fixed and movable bobbin butt supports 176 and 178, respectively, of known form, Fig. 3.

A bobbin butt ring 180 has spaced blocks 181 secured thereto at 182 between recesses 183 in the ring to define pockets 184 for the bobbin butts to allow the latter to extend slightly beyond flange 162, see Fig. 2.

As shown in Fig. 3 stationary plate 160 has formed therethrough an arcuate slot 190 to receive transferrer arm 191, pivoted on a stud 192 held fixed to part of support 158 and having the latch 14 pivoted thereto. The transferrer arm extends rearwardly and has secured thereto at 193 as a part thereof a hammer element 194. As shown in Fig. 4 the hammer element has an upwardly extending arm 195, a cross piece 196, and a depending arm 197 which extends beyond the ring 180 and has a bobbin but engaging lug 198 on the lower end thereof. The high cross piece 196 enables the lug 198 to descend to its low position for transfer without interfering with the ring when bunter 13 pushes latch 14 forwardly in a bobbin changing operation.

Figure 5:
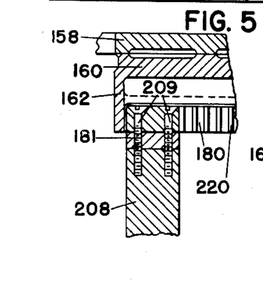
Fig. 5 is an enlarged detail horizontal section on line 5—5, Fig. 3.
Figure 25:
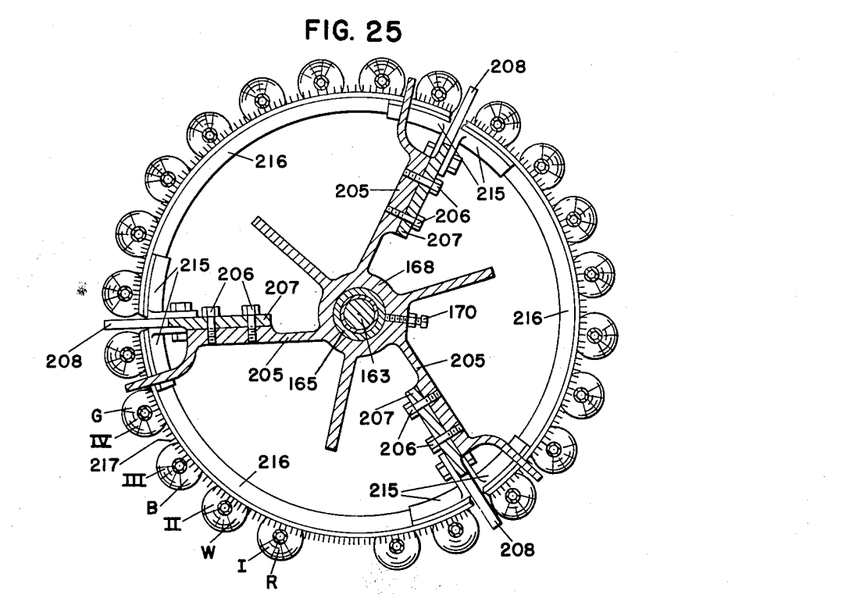
Fig. 25 is a vertical section on line 25—25, Fig. 2.

The ring 180 is supported from disk 169 so that the magazine can, if needed, be given a full turn in either direction around stud 163. The disk 169 is formed with three webs 205 to each of which is fastened at 206 the foot 207 of a tie member 208, see Figs. 2 and 25. The ends of the tie members, see Fig. 5, are secured to the ring in any approved manner, as by screws 209. The members 208 are flat and extend between the pockets 184 so they do not interfere with the bobbins in the magazine. Each tie member has secured thereto angle pieces 215 which support arcuate members 216 to which is secured a mass of fur 217 to engage the conical parts of the bobbins.

Figure 6:
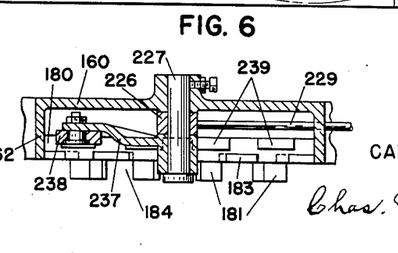
Fig. 6 is a horizontal section on line 6—6, Fig. 3.

The mechanism for preventing rebound and overtravel of the magazine is shown in Figs. 3, 6 and 7. The inner periphery of the ring 180 is formed with gear teeth 220 which mesh with a pinion 221 rotatable on a stud 222 fast with plate 160. Pinned to the pinion at 223 are two lock ratchets 224 and 225, the teeth of ratchets 224 and 225 pointing in opposite directions. A lock pawl 226 is pivoted on a stud 227 fast with plate 160 and has a hook tooth 228 in register with ratchet 224 and is connected by rod 229 to previously described lever 73.

A small lock pawl 230 is pivoted at 231 to pawl 226 and registers with ratchet 225 toward which it is urged by spring 232 supported by pawl 226. A stop screw 233 on pawl 226 limits counterclockwise turning of pawl 230, see Fig. 3, by spring 232 and a stop screw 234 on pawl 226 engages a lug 235 on plate 160 to adjust the distance between the lock pawls and their ratchets. Pawl 226 has integral therewith a handle 236 and a lock arm 237 pivoted on stud 227 has a roll 238 to enter recesses 239 in ring 180 to position the magazine in definitely spaced positions around its axis. Lock arm 237 has a handle 240 and a spring 241 between handles 236 and 240 normally holds the lock pawls spaced from their lock ratchets with stop screw 234 against lug 235 and holds roll 238 in one or another of the recesses 239. Rolls 242 rotatable of studs 243 fixed to plate 160 engage the outer periphery of ring 180 below the stud 163 and support it.

Sleeve 165 is partly surrounded by a drag brake 250 including a stud 251 fast on plate 160 and two arms 252 provided with friction material 253. A screw 254 passes through the arms and has a head 255 between which and one of the arms is a compression spring 256. A nut on the lower end of screw 254, Fig. 3, adjustable on the screw engages the other arm and affords means for varying the checking effect of the brake.

Preparatory to weaving bobbins will be arranged in the magazine in groups of four, each group containing bobbins R, W, B and G having different characteristics. As shown, there are six groups of four bobbins, the bobbins of all the groups being arranged in the same order in the magazine. Bobbin G has been omitted from the group to the right of the transferrer arm, Fig. 3, but this is not necessary. With the magazine arranged as shown in Fig. 3 the groups to the left of the transferrer arm has its bobbins R, W, B and G in positions I, II, III and IV, respectively, and these bobbins and positions correspond, respectively, to ratchets d, c, b and a, and shuttles S4, S3, S2 and S1. The ratchets will be as shown in Fig. 14, so that a 7½ degree motion of ratchet d will rock the magazine to move bobbin R from position I into transfer position, a 15 degree motion of ratchet c will move the magazine to move bobbin W from position II into transfer position, etc.

As the shuttles move into active position one at a time the lever 93 will cause the pawl to slide into register with the ratchet a—d corresponding to the shuttle which is active at any given time. Assuming that shuttle S4 is active as suggested in Fig. 18 and has returned to shuttle box 6 after the feeler F indicated its exhaustion of weft, pawl 100 will register with ratchet d, and as lever 17 rocks to lift latch 14 it will also depress rod 54 which will act through lever 115, rod 122 and arm 124 to move the pawl carrier on a working stroke. At the beginning of the stroke the pawl will move away from bar 107 so that spring 109 can depress the pawl from its normally raised position of clearance of all the ratchets to a position on ratchet d. The pawl will then have an idle motion for three-quarters of its stroke, and then engage tooth T7 of ratchet d and rock the latter 7½ degrees which, by reason of the size of sprockets 148 and 167, will rock the magazine one space, or the angular distance between adjacent bobbins, to place bobbin R, previously in position I, in transfer position under the transferrer arm for transfer into shuttle S4.

If, on the other hand, shuttle S2, for instance, had been active and depleted the pawl would have registered with ratchet b and would have moved it 22½ degrees to rock the magazine three spaces to move bobbin B from position III to transfer position. Similar operations would occur for shuttles S1 or S3, ratchet a having a 30 degree movement in the case of shuttle S1, and ratchet c having a 15 degree movement for shuttle S3. After the magazine has been moved to a position to place any bobbin for transfer it will remain in that position until the next transfer is called.

As the pawl proceeds on its working stroke the lost motion between lugs 128 and 129 will be taken up, after which continued rocking motion of the pawl carrier 85 will caused lever 73 and rod 229 to move to the right, Fig. 1, to move both lock pawls 226 and 230 against their respective lock ratchets, pawl 226 engaging a tooth of its lock pawl to prevent overtravel and lock pawl 230 engaging a tooth of its lock ratchet to prevent rebound. The lock pawls will remain in restraining position during bobbin transfer, lever 17 remaining in position to hold rod 54 down long enough to accomplish this result. The magazine will thus be held against vibration during bobbin transfer. After bobbin transfer is completed lever 17 will return to its normal position and the carrier 85 will return to its normal position shown in Fig. 10.

After the previously described transfer of bobbin R bobbin W will be adjacent to the transfer position, or in position I, occupying the position previously occupied by bobbin R, and the unit U will be in a new position 7½ degrees to the left of the position shown in Fig. 14 with tooth T5 in position to receive only 7½ degrees of motion from the pawl, tooth T3 15 degrees, and tooth T1 22½ degrees.

Of the bobbins in the group originally in positions I–IV, there will remain, after transfer of bobbin R, the three bobbins W, B and G. Any one of these bobbins can be transferred by an operation similar to those already described. Thus, bobbins W, B and G can be transferred in that order, all drawn from the same original group. The magazine always turns in the same direction so that any bobbin remaining in the group to the left, Fig. 3, of the position occupied by a previously transferred bobbin can be transferred. The magazine is not reversible under normal running conditions so that a bobbin in the group ahead, or to the right of a transferred bobbin cannot be moved to transfer position. Thus, the bobbin of the group could be transferred in any of the following orders: R, W, B and G, or R, B and G, or R, W and G, or R and G, or W, B and G, or W and G, or B and G. These do not exhaust the possible orders, but are given as examples. If a bobbin is skipped the magazine cannot return to it, thus in the above order R, B and G, bobbin W is skipped, and in the order R, W and G bobbin B is skipped, and neither of these bobbins can be transferred, at least until the magazine has by its turning again moved them in position from which they can be moved to transfer position.

After transfer of any bobbin the four bobbins occupying positions I, II, III and IV, will constitute a new group the bobbins of which will not necessarily be in the order of the original or previous group. Each transfer therefore establishes a new group which may contain some of the bobbins of the previous group and all of the bobbins of which, under favorable conditions of depletion of the shuttles, can be transferred.

For each of the new groups the ratchets will take a corresponding new position and transfer from a new group will be in a manner similar to that already described. Thus, if bobbins B, G, R and W constituting a new group are in positions I, II, III and IV, respectively, the unit U will be 15 degrees to the left of the position shown in Fig. 14 and ratchet b corresponding to bobbin B in position I will have its tooth T3 7½ degrees from line f, or the end of the stroke of the pawl. Bobbin B will require to be moved only one space to reach transfer position, as was the case of bobbin R, and disk b, able to be moved only 7½ degrees by the pawl, will cooperate with the pawl to rock the magazine one space and place bobbin B in transfer position. Similar conditions will exist for any order of bobbins in the group occupying positions I, II, III and IV. Thus in this new group bobbins R and W could be transferred, leaving bobbin G untransferred.

If two successive transfers of the same character of weft occur there will be an angular motion of the magazine equal to the angular space occupied by a group. This is true because the ratchet corresponding to the first of the transfers will have its tooth, T1, T3, T5 or T7, moved to the end of the working stroke of the pawl, line f in Fig. 14, and when the pawl again rocks when registered with the same ratchet it will give the latter a full 30 degree motion, which will move the second of the two bobbins to transfer position.

When placing bobbins in the magazine by hand during loom operation the magazine can be turned in its normal feed direction indicated by arrow e, Fig. 3, or in the reverse direction, provided the lock pawls are not in locking position. The ratchets turn with the magazine and the teeth of the ratchets, at the end of the hand placement of bobbins in the magazine, may not be in the position they would have occupied if hand placement had not occurred. When rocking the magazine for the next transfer, however, the pawl will move the ratchet with which it is registered the correct amount to place in transfer position a bobbin corresponding to the shuttle to be replenished. This operation of the pawl and ratchets is similar to that previously described for the condition where bobbins B, G, R and W occupied positions I, II, III and IV for a transfer. This is due to the fact that each ratchet corresponds to a particular bobbin in each group, and when the pawl reaches the end of its working stroke, the tooth engaged with it will be on line *f*, Fig. 14, and a bobbin corresponding to the ratchet engaged by the pawl will be in transfer position. Thus, if shuttle S2 is active the pawl will register with ratchet *b* the tooth T3 of which requires a 22½ degree movement to reach line *f*, and bobbin B corresponding to shuttle S2 would need to be moved a distance equal to three spaces between adjacent bobbins. If after hand placement of bobbins, bobbin G should occupy the position previously occupied by bobbin B, then ratchet *b* will have its tooth T3 so placed as to require only a 15 degree movement, and if replenishment of shuttle S2 is called, bobbin B will be moved across only two bobbin spaces to transfer position.

The foregoing description of the magazine and the ratchets has been concerned primarily with the preferred form of the invention in which four shuttles are used and wherein the bobbins are arranged in groups of four each and sprocket 148 is twice the size of sprocket 167. Also, the ratchets are so related angularly that the teeth of any ratchet will be spaced around the axis of the unit U from the teeth of an adjacent ratchet by an amount of 7½ degrees.

Figure 15:
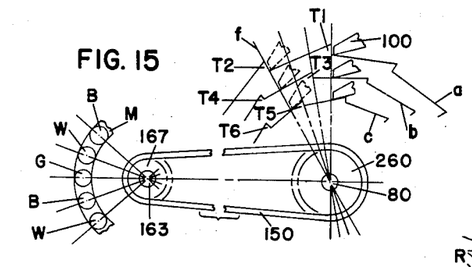
Figs. 15, 16 and 17 are similar to Fig. 14 showing the ratchet and pawl relation for the first, second and third modified forms used for three, two and one color, respectively.

In the first modified form of the invention only three of the shuttles S1, S2 and S3 will be used and the bobbins W, B and G will be arranged in groups of three bobbins each and sprocket 148 will be replaced by a sprocket 260 which is one and a half times the size of sprocket 167. In this first modification only three of the ratchets *a*, *b* and *c* will be used and the teeth of these ratchets, see Fig. 15, will be spaced angularly around the axis of unit U in 10 degree steps. Thus, the angular distance between teeth T1 and T3 is 10 degrees, between teeth T3 and T5 is 10 degrees, and between tooth T5 and the line, *f* or the end of the working stroke of the pawl 100, will also be 10 degrees. The ratchet *d* will not be used but can be left on unit U.

When three colors are used ratchets *c*, *b* and *a* will correspond respectively to bobbins W, B and G in positions I, II and III, respectively, for shuttles S3, S2 and S1. Ratchet *a*, Fig. 15, will require a full 30 degree motion to place bobbin G in transfer position, and since this ratchet also required a full motion to place bobbin G in transfer position, Fig. 14, it can remain in its original position. Ratchets *b* and *c*, however, must have their positions changed relatively to ratchet *a*, and this is accomplished by having the bolts 140 go through holes 261 and 262 in ratchets *b* and *c*, respectively. These holes are so placed as to provide the 10 degree spacing of the teeth of the three ratchets already described. The pawl is thus able to move ratchet *b* 20 degrees to place bobbin B in transfer position, and move ratchet *c* 10 degrees to move bobbin W to transfer position.

In the second modification, adapted for two colors, ratchets *b* and *a* are used and correspond respectively for bobbins B and G in positions I and II for shuttles S2 and S1, respectively. Sprocket 260 will be replaced by sprocket 265 equal to sprocket 167. Ratchet *a* will again be in its original position, but ratchet *b* will be spaced angularly from it by 15 degrees by having bolts 140 pass through hole 266 in ratchet *b*. Ratchets *c* and *d* are not used and their angular position is immaterial, as was the position of ratchet *d* for three colors. Ratchet *a* will receive a full 30 degree motion from the pawl to move bobbin G in position II to transfer position, and ratchet *b* will receive a 15 degree motion to place bobbin B, position I, in transfer position.

Figure 16:
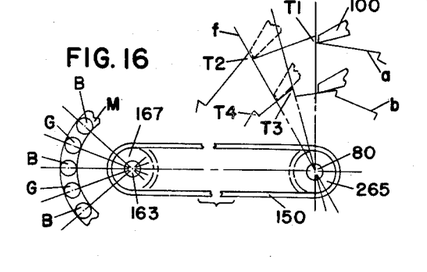
Figure 17:
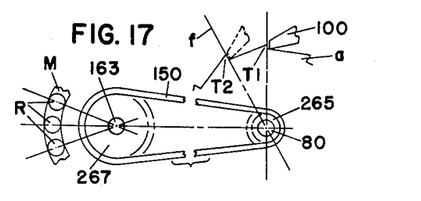

The settings for three and two colors possess the same advantages as the setting for four colors. Thus, Fig. 15, bobbins B and G could be transferred in that order after transfer of bobbin W, all from a single group, and Fig. 16, bobbin G could be transferred after bobbin B, both from the same group.

In the third modification in which only one shuttle is used sprocket 167 is replaced by a sprocket 267 which is twice the size of sprocket 265 and the pawl will register only with ratchet *a* and give it 30 degree movements.

To simplify the description of the invention the magazine has been described as holding twenty-four reserve bobbins, but the invention is not limited to this number. The capacity of the magazine should be such, however, as will permit operation with four, three, or two shuttles. In all of the settings pawl 100 may be considered to be pawl means with which the ratchets are cooperative to give the magazine the angular movements described.

From the foregoing it will be seen that the invention sets forth a rotary weft replenishing mechanism for a shifting shuttle box loom operating in such manner that more than one bobbin can be transferred from a group of bobbins corresponding to the shuttles adjacent to transfer position provided the bobbins involved in the successive transfers are progressively more distant in the original group from the transfer position. There is no need for shifting from one primary group to another when a single bobbin has been transferred as has been the case heretofore. After the first transfer a secondary group will be next to transfer position which may contain bobbins belonging to two adjacent primary groups. The ratchets cooperating with the pawl, by their angular shiftings, are able to keep track of the bobbins in a primary or secondary group and call the correct bobbin for replenishment of any of the shuttles. If the magazine has six primary groups of four bobbins each it is possible and indeed quite likely that there will be many more than six transferring operations. The indicating lever controlled from the pattern mechanism is so shaped by its curved under surfaces that it can remain in steady position to prevent vibration of the pawl when at any level, each surface when engaging its size roll being concentric with the axis of the pattern chain except the smallest roll, in which event a stop holds the indicating lever stationary. The holding bar engages a part of the pawl to hold the latter out of engaging position with respect to the ratchets as it shifts laterally incident to shifting of the shuttle boxes, but as soon as the pawl is called into action on the working stroke it moves away from the holding bar and is thus enabled to move into working relation with the pawl registered with it. The lock for the magazine employs two oppositely disposed lock ratchets and two lock pawls which are moved against their ratchets near the end of a turning movement of the magazine to prevent both rebound and overrun of the magazine. The smaller pawl is spring positioned so that it can yield if it should engage a tooth of its pawl as the two pawls move toward holding position. The roll which fits into the recesses on the ring 180 exerts a normal yielding force which however is increased when the lock pawls move toward locking position to assist in checking momentum of the magazine.

The ring 180 is supported on flat tie members the greater cross sectional dimension of which is substantially radial with respect to the axis of the magazine, this construction providing increased rigidity so that the inner end of the magazine can be held concentric with the axis. The unit U comprises a series of ratchets the teeth of which are staggered progressively from end to end of the series, the interval of angular staggering depending upon whether the loom is operating with four, three or two shuttles. Certain of the ratchets are made with holes so placed that they can occupy different angular positions depending upon how many shuttles are being used on the loom. The unit includes the spacers which are fixed against angular movement relative to the shaft of the unit and the ratchets after being rotated on the spacers to adjusted angular position are held by a tie rod passing through the spacers and ratchets.

Having now particularly described and ascertained the nature of the invention and in what manner the same is to be performed, what is claimed is:

1. In a weft replenishing multi-shuttle loom operating with a given number of shuttles arranged in a given order having distinctive wefts and movable one at a time to active position, a rotary magazine having groups of reserve bobbins, each group having said given number of bobbins and there being a bobbin corresponding to each of the shuttles in each group, the bobbins of each group arranged in an order corresponding to that of the shuttles, control means to call said shuttles into action, a plurality of ratchets arranged along and rotatable about an axis as a unit operatively connected to and movable angularly with said magazine, there being a ratchet for each shuttle, a pawl under control of said control means and movable thereby into register with the ratchet corresponding to the active shuttle, means to give said pawl a working stroke of the same length for each replenishing operation of the loom, said ratchets all being of equal number of equal teeth, and means holding said ratchets in said unit in such manner that the teeth of each ratchet are staggered angularly with respect to the teeth of the other ratchets, the staggering being progressive from one end of the unit to the other end thereof and the amount of staggering for adjacent ratchets being the length of a tooth divided by the number of ratchets, the pawl when having a working stroke moving the ratchet registered therewith an angular distance effective to cause the magazine to move a bobbin corresponding to the ratchet to transfer position.

2. The loom set forth in claim 1 wherein said given number of shuttles, bobbins in each group, and ratchets is four, and the amount of staggering of teeth of adjacent ratchets is equal to one quarter of the length of a ratchet tooth.

3. The loom set forth in claim 1 wherein said given number of shuttles, bobbins in each group, and ratchets is three, and the amount of staggering of teeth of adjacent ratchets is equal to one-third of the length of a ratchet tooth.

4. The loom set forth in claim 1 wherein said given number of shuttles, bobbins in each group, and ratchets is two, and the amount of staggering of teeth of adjacent ratchets is equal to one-half the length of a ratchet tooth.

5. In a weft replenishing mechanism, a rotary magazine having distinctive bobbins arranged in groups in the same order, a rotatable unit of ratchets, one ratchet for each distinctive bobbin in a group, operative connections between the magazine and unit causing the latter when moved angularly to move the magazine angularly, a pawl registrable with each ratchet having a given working stroke of the same length incident to each operation of the mechanism, and means holding said ratchets in staggered relation, the staggering being progressive from one end to the other end of the unit, and the amount of staggering being such that when any ratchet is moved by the pawl the unit will cause the magazine to move a bobbin corresponding to the ratchet to transfer position.

6. In a weft replenishing mechanism, a rotary magazine for reserve bobbins, a gear secured to and concentric with the magazine, a pinion meshing with said gear rotatable about a fixed axis, two lock ratchets secured to the pinion, the teeth of the two ratchets pointing in opposite directions, two stop pawls, one for each lock ratchet, pivoted about a fixed axis and normally spaced from the lock ratchets, means having an operative motion effective to give the magazine an angular movement, and connections from said means to said pawls effective to move said pawls into holding relation with their respective lock ratchets near the end of said angular movement to prevent rebound and overrrun of the magazine.

7. The mechanism set forth in claim 6 wherein said connections include a lost motion device to enable the means to have the first part of said motion thereof without moving the pawls and thereafter effect motion of the pawls toward their ratchets.

8. In a rotary weft replenishing mechanism provided with a pawl having a fixed working stroke, a ratchet unit controlling angular movement of the mechanism comprising ratchets coaxial with the unit and each ratchet having the same number of equal teeth and being registrable with the pawl, the teeth of each ratchet being staggered relatively to the teeth of the other ratchets so that the pawl is effective to give varying angular movement to the rotary replenishing mechanism depending upon which ratchet registers with the pawl.

9. In a multicolor weft replenishing loom having a gang of shifting shuttle boxes to hold a plurality of shuttles of given number with distinctive weft arranged in a given order, said shuttles movable to active position one at a time, a rotary reserve bobbin magazine having a transfer station and having primary groups of bobbins, each primary group having a bobbin corresponding to a shuttle and the bobbins of each primary group being arranged in an order corresponding to said given order of shuttles, said magazine being rotatable in a given direction to move said groups of bobbins toward said transfer station, the magazine remaining at rest after a bobbin transferring operation with a group of bobbins adjacent to said transfer station which may be arranged in an order starting next to the transfer station different from the primary order, and means to move the magazine in said given direction to move any bobbin in said different group regardless of its position in said different group to said transfer station preparatory to replenishment of the corresponding shuttle.

10. In a multicolor weft replenishing loom having a gang of shifting shuttle boxes to hold a plurality of shuttles of given number with distinctive weft arranged in a given order, said shuttles movable to active position one at a time, a rotary reserve bobbin magazine having a transfer station and having primary groups of bobbins, each primary group having a bobbin corresponding to a shuttle and the primary group being arranged in an order corresponding to said given order of shuttles, said magazine being rotatable in a given direction to move said groups of bobbins toward said transfer station, the magazine remaining at rest after a bobbin transferring operation with a secondary group of said given number of bobbins adjacent to said transfer station containing at least one bobbin of one primary group and the remainder from another primary group, and means to give the magazine successive movements for successive bobbin transferring operations to place the bobbins in said secondary group at said transfer station provided said successive transferring operations involve bobbins in said secondary group which were progressively more distant from the transfer station prior to the first of said transferring operations.

11. In a multicolor weft replenishing loom having a gang of shifting shuttle boxes to hold a plurality of shuttles of given number with distinctive weft arranged in a given order, said shuttles movable to active position one at a time, a rotary reserve bobbin magazine having a transfer station and having a group of bobbins adjacent to said transfer station, the group containing a bobbin corresponding to each of said shuttles, and means to give said magazine successive movements to place the bobbins in said group in said transfer position for replenishing operations relative to their respective shuttles provided said successive operations involve bobbins which were progressively more distant from the transfer station at the first of said successive replenishing operations.

12. In a multicolor weft replenishing loom having a gang of shifting shuttle boxes to hold a plurality of shuttles of given number with distinctive weft arranged in a given order, said shuttles movable to active position one at a time, a rotary reserve bobbin magazine having a transfer station and having a group of bobbins, one for each shuttle, arranged in an order corresponding to said order of shuttles, and means to give the magazine successive angular movements for successive replenishing operations relative to said shuttles to move said bobbins progressively to said transfer station provided said replenishing operations involve the shuttles in an order which is the same as the order of the bobbins in said group.

13. The loom set forth in claim 12 wherein said means includes a ratchet corresponding to each shuttle and a pawl movable into register with the ratchet corresponding to the shuttle which is active.

14. The loom set forth in claim 12 wherein said given number of shuttles is four and the number of bobbins in said group is also four and said means gives said magazine four successive equal angular movements.

15. The loom set forth in claim 12 wherein said given number of shuttles is three and the number of bobbins in said group is three and said means gives the magazine three equal successive angular movements.

16. The loom set forth in claim 12 wherein said given number of shuttles is two and the number of bobbins in the group is also two and said means gives the magazine two successive equal angular movements.

17. In a weft replenishing loom having a gang of shifting shuttle boxes and a rotary magazine for reserve bobbins, a unit comprising a plurality of ratchets operatively connected to the magazine to control angular movements thereof, a pawl movable into register with the ratchets one at a time, pattern chain mechanism movable about an axis to control shifting of the boxes, a series of rolls of different sizes, one size for each shuttle box, moving with the pattern chain around said axis, an indicating lever over said rolls moved to different levels under control of the rolls as the latter move around said axis, and operative connections between the lever and pawl effective to move the latter into register with one or another of said ratchets, depending upon which size roll is under the lever.

18. The loom set forth in claim 17 wherein the under side of said lever is provided with a plurality of surfaces to engage their respective rolls effective to prevent vibration of the lever as the rolls pass thereunder.

19. The loom set forth in claim 18 wherein said surfaces when engaged by their respective rolls are concentric with said axis.

20. The loom set forth in claim 18 wherein said differently sized rolls traverse different paths arranged along said axis and said lever has the surfaces thereof spaced lengthwise of said axis and a stop is provided to support the lever when the rolls under said lever are of the smallest size.

21. In a ratchet unit for a multicolor weft replenishing loom having a rotary reserve bobbin magazine the angular movements of which are determined by the angular movements of the unit, a shaft, a plurality of ratchets arranged side by side along said shaft, and means holding said ratchets fixed with respect to said shaft with the teeth of the ratchets staggered angularly around said shaft and progressively from one end to the other end of said plurality of ratchets.

22. The unit set forth in claim 21 wherein means including bolts and holes for them in said ratchets are provided to vary the angular relation of the ratchets with respect to each other.

23. The unit set forth in claim 21 wherein means including spacers between the ratchets are held against rotation around the shaft and removable securing means passing through the ratchets and spacers cause the ratchets to turn with the shaft, the ratchets upon removal of the securing means being rotatable on the spacers to vary the angular relation of the ratchets on the shaft.

24. The unit set forth in claim 21 wherein said ratchets are four in number and the amount of said staggering of the teeth from ratchet to ratchet is one-quarter of the length of a ratchet tooth.

25. In a weft replenishing mechanism, a rotary magazine having a capacity of a given number of reserve bobbins, a pawl which has a working stroke incident to each replenishing operation of the loom, a series of ratchets to be operated one by one by the pawl, each ratchet having the same number of equal teeth, the number of said ratchets being a factor of said given number of reserve bobbins which the magazine can hold, means holding said ratchets in fixed position with respect to each other but with their teeth staggered progressively from end to end of the series angularly with respect to each other by an amount equal to the length of a tooth divided by said factor, and gearing between said ratchets and said magazine effective when any ratchet is moved by said pawl an angular distance equal to the length of a tooth divided by said factor the magazine will move angularly through a distance equal to the distance between adjacent bobbins.

26. The mechanism set forth in claim 25 wherein said gearing includes a sprocket fixed with respect to said ratchets and a second sprocket fixed with respect to the magazine and a chain meshing with said sprockets.

27. In a weft replenishing mechanism for a loom, a rotary magazine having a capacity of a given number of reserve bobbins, a ratchet unit including a series of equal ratchets, the distance between adjacent teeth on any ratchet corresponding to a given angular space, means holding said ratchets with the teeth thereof staggered progressively from end to end of the series in such manner that the angular interval between teeth of adjacent ratchets is equal to said angular space divided by the number of ratchets, and gearing operatively connecting the ratchets and the magazine effective when any ratchet moves angularly through one angular interval to move the magazine an angular distance equal to the angular distance between adjacent bobbins therein 28. In a weft replenishing mechanism for a loom having shifting shuttle boxes movable one at a time to active position, a rotary magazine, a series of ratchets, one ratchet for each shuttle box, comprising a unit effective when turned to cause turning of the magazine, a pawl movable lengthwise of the series into registry with the ratchet corresponding to whichever shuttle box is in active position, means normally holding said pawl in a position to avoid engagement of said ratchets when the pawl moves from registry with one ratchet to registry with any other ratchet, and means to give the pawl a working stroke, the latter means effective in the first part of said stroke to move the pawl away from said holding means and enable the pawl to engage the ratchet registered therewith.

29. In a weft replenishing mechanism, a rotary reserve bobbin magazine, a series of ratchets arranged as a unit rotatable about an axis and operatively connected to the magazine to cause angular movement of the latter when the unit moves angularly, a pawl movable in a direction parallel to said axis into registry with any one of said ratchets, holding means normally effective to prevent engagement of the pawl with the ratchets when said pawl is moving parallel to said axis, and means operative on a replenishing operation of the mechanism to give said pawl a working stroke with respect to whichever ratchet is registered with the pawl, the last named means effective during the first part of said working stroke to move the pawl away from said holding means to enable the pawl to become operatively related with the ratchet registered therewith.

30. The replenishing mechanism set forth in claim 29 wherein said holding means includes a bar parallel to said axis and a part of the pawl normally held against said bar when the pawl moves parallel to said axis, said part of the pawl moving away from said bar on the first part of the working stroke of the pawl.

31. In a weft replenishing mechanism, a rotary magazine for reserve bobbins, a gear secured to and concentric with the magazine, a pinion meshing with said gear rotatable about a fixed axis, two lock ratchets secured to the pinion, the teeth of the two ratchets pointing in opposite directions, two stop pawls, one for each lock ratchet, pivoted about a fixed axis and normally spaced from the lock ratchets to move one of said pawls being pivoted on the other pawl, means having an operative motion effective to give the magazine an angular movement, and connections from said means to said other pawl effective to move both of said pawls into holding relation with their respective lock ratchets near the end of said angular movement to prevent rebound and overrun of the magazine.

32. The structure set forth in claim 31 wherein resilient means are operatively interposed between said pawls to enable said one pawl to yield if engaging a tooth of its ratchet as the pawls move toward holding relation with their ratchets.

33. In a weft replenishing mechanism, a rotary magazine for reserve bobbins, a gear secured to and concentric with the magazine, a pinion meshing with said gear rotatable about a fixed axis, two lock ratchets secured to the pinion, the teeth of the two ratchets pointing in opposite directions, two stop pawls, one for each lock ratchet, pivoted about a fixed axis and normally spaced from the lock ratchets to move one of said pawls being pivoted on the other pawl, means having an operative motion effective to give the magazine an angular movement, means normally exerting a force on the magazine to resist rotation thereof, and connections from said means to said pawls effective to move said pawls into holding relation with their respective ratchets near the end of said angular movement of the magazine to prevent rebound and overrun of the magazine and also increase said force to increase the resistance to rotation of the magazine.

34. The mechanism set forth in claim 32 wherein said means normally exerting a force is a lever pivoted about said fixed axis and resilient means operatively interposed between said pawls and the last named means.

35. In a rotary reserve bobbin magazine, a plate adapted for attachment to a fixed structure, a stud fixed to the plate determining the axis of the magazine, a sleeve rotatable on the stud, a disk spaced from the plate secured to the sleeve, webs formed on the disk extending toward the plate, flat tie members secured to the webs extending toward the plate, said tie members located between bobbins when the latter are placed in the magazine and having the greater cross sectional dimension thereof substantially radial with respect to said axis, a ring secured to said tie members held thereby concentric with said axis and having provision to receive the butts of bobbins, and means on the disk to receive the tips of bobbins.

36. In a multi-color rotary weft replenishing mechanism provided with pawl means which when operating has a fixed working stroke, a ratchet unit controlling angular movement of the mechanism comprising ratchets, one for each color, coaxial with the unit and each ratchet having the same number of equal teeth and being cooperative with the pawl means, the teeth of each ratchet being staggered relative to the teeth of the remainder of the ratchets so that the pawl means is effective to give varying angular movements to the rotary replenishing mechanism depending upon which ratchet cooperates with the pawl means.

References Cited in the file of this patent

UNITED STATES PATENTS

| 671,202 | Baker et al. | Apr. 2, 1901 |
| 1,045,443 | Ryon | Nov. 26, 1912 |
| 1,627,310 | Blackston | May 3, 1927 |
| 2,125,470 | Wiget | Aug. 2, 1938 |

FOREIGN PATENTS

| 713,029 | France | Aug. 10, 1931 |